(12) United States Patent
Rowley

(10) Patent No.: US 8,100,114 B2
(45) Date of Patent: Jan. 24, 2012

(54) FUEL VAPORIZER FOR FUEL INJECTED ENGINES

(76) Inventor: Gerald W. Rowley, Delray Beach, FL (US)

( * ) Notice: Subject to any disclaimer, the term of this patent is extended or adjusted under 35 U.S.C. 154(b) by 737 days.

(21) Appl. No.: 12/134,362

(22) Filed: Jun. 6, 2008

(65) Prior Publication Data

US 2010/0050996 A1 Mar. 4, 2010

Related U.S. Application Data

(60) Provisional application No. 60/942,773, filed on Jun. 8, 2007.

(51) Int. Cl.
*F02G 5/00* (2006.01)
(52) U.S. Cl. .................. 123/549; 123/1 A; 123/195 E; 261/156
(58) Field of Classification Search ............... 123/195 E, 123/558, 552, 549, 547, 546, 545, 544, 543; 165/DIG. 356, DIG. 121, DIG. 118; 261/149–153, 261/156
See application file for complete search history.

(56) References Cited

U.S. PATENT DOCUMENTS

| | | | | |
|---|---|---|---|---|
| 2,796,239 A * | 6/1957 | Holmes et al. | | 165/164 |
| 4,031,875 A * | 6/1977 | Tyler | | 123/590 |
| 4,108,953 A * | 8/1978 | Rocco | | 261/142 |
| 4,318,384 A * | 3/1982 | Moffett | | 123/557 |
| 6,578,532 B1 | 6/2003 | Rowley | | |
| 6,820,864 B2 * | 11/2004 | Amou et al. | | 261/78.1 |
| 2004/0025784 A1 * | 2/2004 | Kawamura et al. | | 117/200 |

* cited by examiner

*Primary Examiner* — Michael Cuff
*Assistant Examiner* — Hung Q Nguyen
(74) *Attorney, Agent, or Firm* — Bachman & LaPointe, P.C.

(57) ABSTRACT

Free heat from an exhaust manifold of an internal combustion engine or an electric heater supplies heat to a vaporizer. Gasoline is converted from fluid to vapor in the vaporizer and sent directly to the fuel injectors. Water fog may be added to the air intake manifold. One embodiment adds a catalyst to the vaporizer to convert gasoline to propane vapor. Fuel efficiency from 30 to 43 miles per gallon has been tested.

12 Claims, 11 Drawing Sheets

FUEL VAPORIZER FOR FUEL INJECTED ENGINES

CROSS REFERENCE APPLICATIONS

This application is a non-provisional application claiming the benefits of provisional application No. 60/942,773 filed Jun. 8, 2007.

FIELD OF INVENTION

The present invention relates to pre-heating fuel such as gasoline, alcohol, kerosene, diesel or ethanol before injecting the heated fuel vapors into a fuel system on an internal combustion engine.

BACKGROUND OF THE INVENTION

U.S. Pat. No. 6,578,532 (2003) to Rowley discloses a fuel vaporization system for carburetor type gasoline engines. A fuel vaporization chamber is in fluid communication with the gas tank. The fuel vaporization chamber is in thermal contact with the engine exhaust. The fuel vapors are sent to a molecule mixture box where water vapor is added. A fuel blower from the molecule mixture box sends the vapor mixture to the intake manifold. Fuel efficiency is increased.

What is needed is a fuel vaporization system tailored to an electronic fuel injected engine with multiple injectors. The present invention supplies such a device.

A gasoline fuel pump connects to a pressure regulator and reduces the fuel pressure to about 40-60 psi. The fuel enters a vaporization chamber which is heated by exhaust heat via the exhaust manifold. A metering needle valve supplies raw gas at a specific quantity to be vaporized before allowing another quantity of fuel to enter the heating chamber. The vaporized fuel leaves the heating chamber to the fuel rail to the existing fuel injectors. Water vapor is also injected into the air intake manifold. This invention is non-obvious because it improves mileage from 30 mpg to 43 mpg and eliminates two mechanical blowers and a molecule mixture box from the '532 patent.

SUMMARY OF THE INVENTION

An aspect of the present invention is to supply vaporized gasoline or other liquid fuels to fuel injectors to improve engine efficiency.

Another aspect of the present invention is to use exhaust air heat to vaporize the gasoline.

Another aspect of the present invention is to inject gasoline vapors directly into the fuel line supplying fuel to the injections on the fuel rail.

Another aspect of the present invention is to provide a thermostatically controlled heat exchanger for the vaporizer.

Another aspect of the present invention is to provide an embodiment that converts gasoline to propane vapors via a catalyst.

Another aspect of the present invention is to provide a battery operated electric heater to vaporize the fuel.

Another aspect of the present invention is to provide a metal block embodiment having an electric heater and a fuel channel.

Other aspects of this invention will appear from the following description and appended claims, reference being made to the accompanying drawings forming a part of this specification wherein like reference characters designate corresponding parts in the several views.

A vaporizer is physically connected to an exhaust manifold of an engine or an electric heating element. About 600° F. heat is available to vaporize gasoline in the vaporizer. The heating chamber will operate in the range of about 250° F. to 475° F. In this range most liquid fuels will be vaporized. Inside the vaporizer a reservoir of fluid floats a float. When the fluid vaporizes the float drops, thereby opening a needle valve to feed more raw fuel into the reservoir. The vapors move to the fuel injector supply line via a separate port. A fogged (misted) water is sprayed into the air intake manifold which mixes with the incoming air.

A propane embodiment adds a catalyst such as silica alumina to the vaporizer to create propane vapors from gasoline liquid/vapor.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
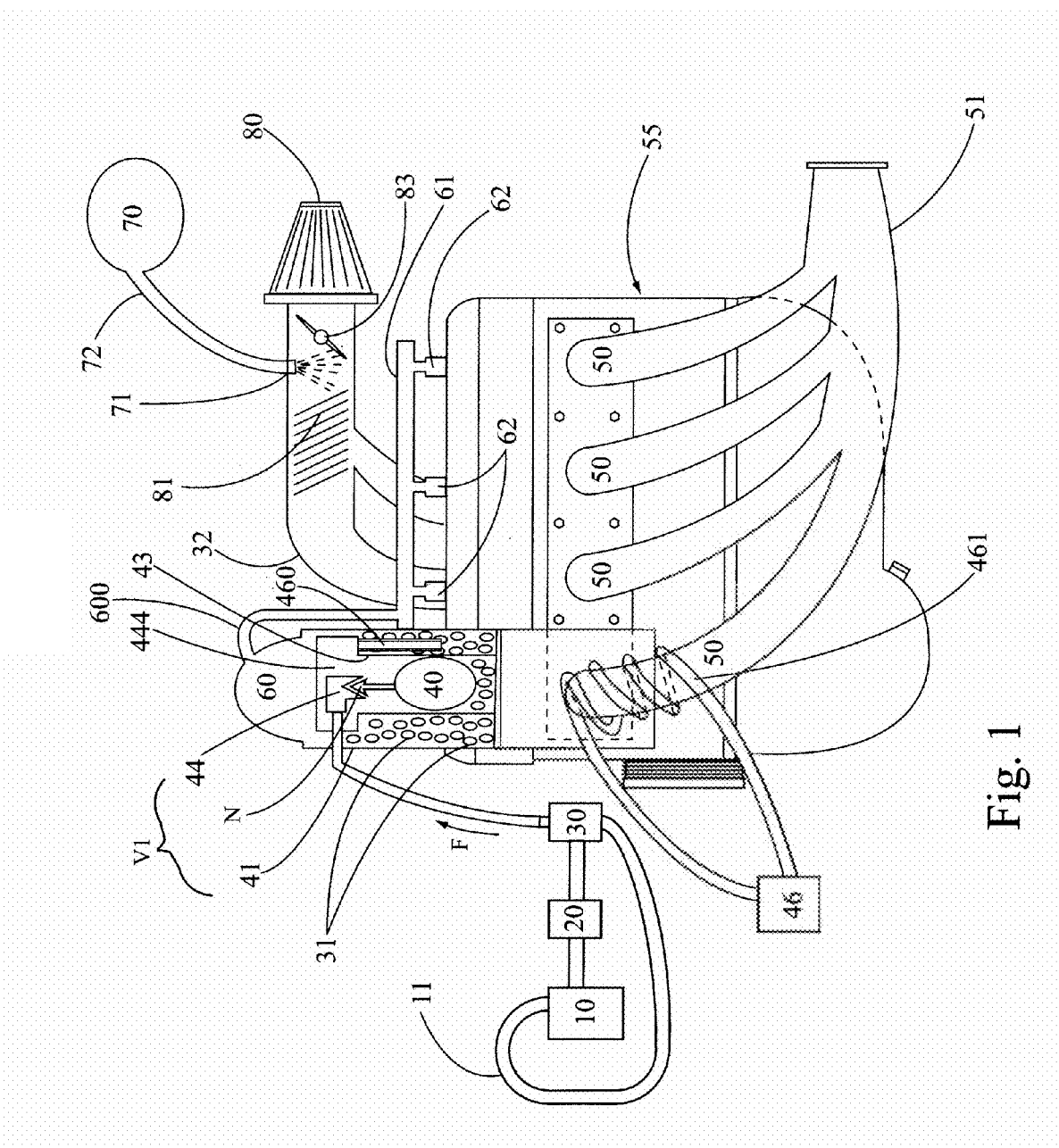
FIG. 1 is a schematic drawing of a gasoline to propane vapor embodiment.

Referring first to FIG. 1 an internal combustion engine 55 has a fuel rail 61 sending fuel to fuel injectors 62. The unused fuel is returned to the fuel tank 10. An exhaust manifold 50 supplies heat to a vaporizer V1. An optional thermostatically controlled heat exchanger 46 may interface between the vaporizer V1 and the exhaust manifold 50. Coolant line 461 decreases the temperature of the vaporizer V1 as controlled by a thermostat in heat exchanger 46.

A fuel pump 20 pumps gasoline from tank 10 to pressure regulator 30 (nominally a Mallory™ 4309) to drop typical fuel pump pressure of 40-80 psi to about 40-60 psi via pipe F to the vaporizer V1. The vaporizer V1 has an outside housing 41 which supports a catalyst 31 (preferably silica alumina).

An inside guide 43 supports a float 40 to float in fluid gasoline on the bottom of the vaporizer V1. Heat from the exhaust manifold 50 heats the vaporizer V1 which then vaporizes the fluid gasoline, and via the catalyst 31, turns it into a propane vapor, thereby lowering the fluid level and dropping the float 40. By dropping the float 40 the needle N drops from its seat 44, thereby sending raw fuel into the heating chamber 444. The vaporized gasoline travels through tube 460, a tube sitting in the catalyst bed. The gasoline vapor is converted to propane vapor. The propane vapor moves to an expansion chamber 60 then thru pipe 600 to the fuel rail 61.

The intake manifold 32 feeds air to the intake side of the cylinder head. The intake manifold 32 has an air filter 80, and a pressurized water reservoir 70 which injects water into the intake manifold 32 via a water fogger nozzle 71 and a pipe 72. A stationary spiral baffle 81 mixes the water fog and air mixture. The air intake valve 83 regulates the fuel/air mixture.

Figure 2:
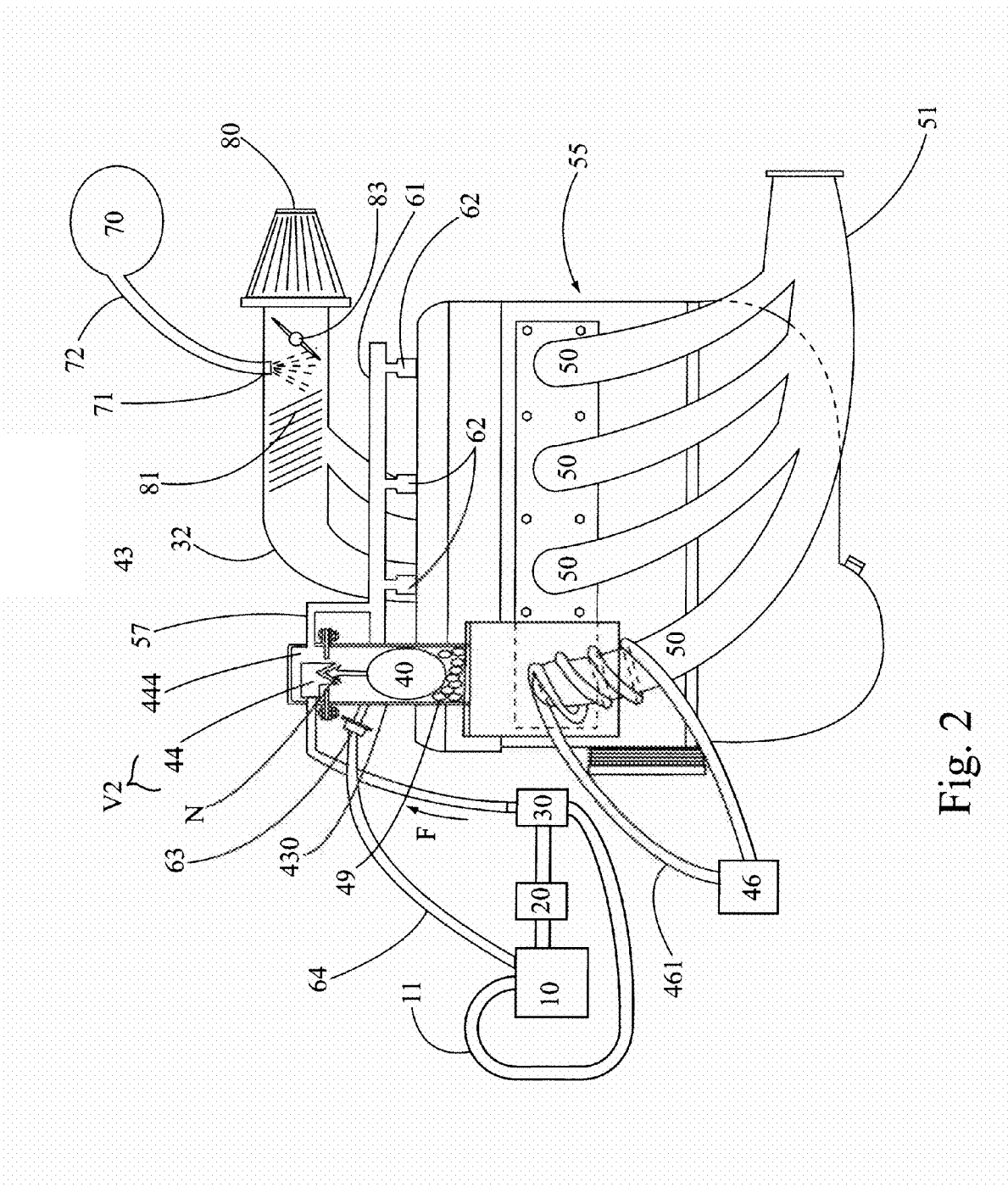
FIG. 2 is a schematic drawing of a gasoline vapor embodiment.

Referring next to FIG. 2 a vaporizer V2 converts fluid gasoline to vapor gasoline on the same engine 55. The vaporizer housing 430 supports some metal shot 49 used in the heat exchange operation. The housing is preferably stainless steel metal. The float 40 is preferably a stainless steel globe. The needle valve seat 44 is preferably brass. The needle N is preferably made of Viton™, or any high temperature composite material. When the float 40 drops, raw gasoline enters the valve seat 44 re-filling the reservoir 430. The vaporized fuel enters the vapor line 57 which connects to the fuel rail 61 which pushes vaporized fuel into the injectors 62.

What vaporized fuel is not used by the injectors 62 passes through the end of the fuel rail 61 to the secondary fuel regulator 63. The vaporized fuel passes through the secondary regulator 63 and returns to the fuel tank 10 via a fuel return line 64. The vaporized fuel recondenses into liquid as it travels to the fuel tank. Throttle control of the engine is maintained by the computer module. The computer senses when the throttle body (not shown) is opened up more which relays a signal to allow the injectors to increase fuel flow to the cylinders.

Figure 3:
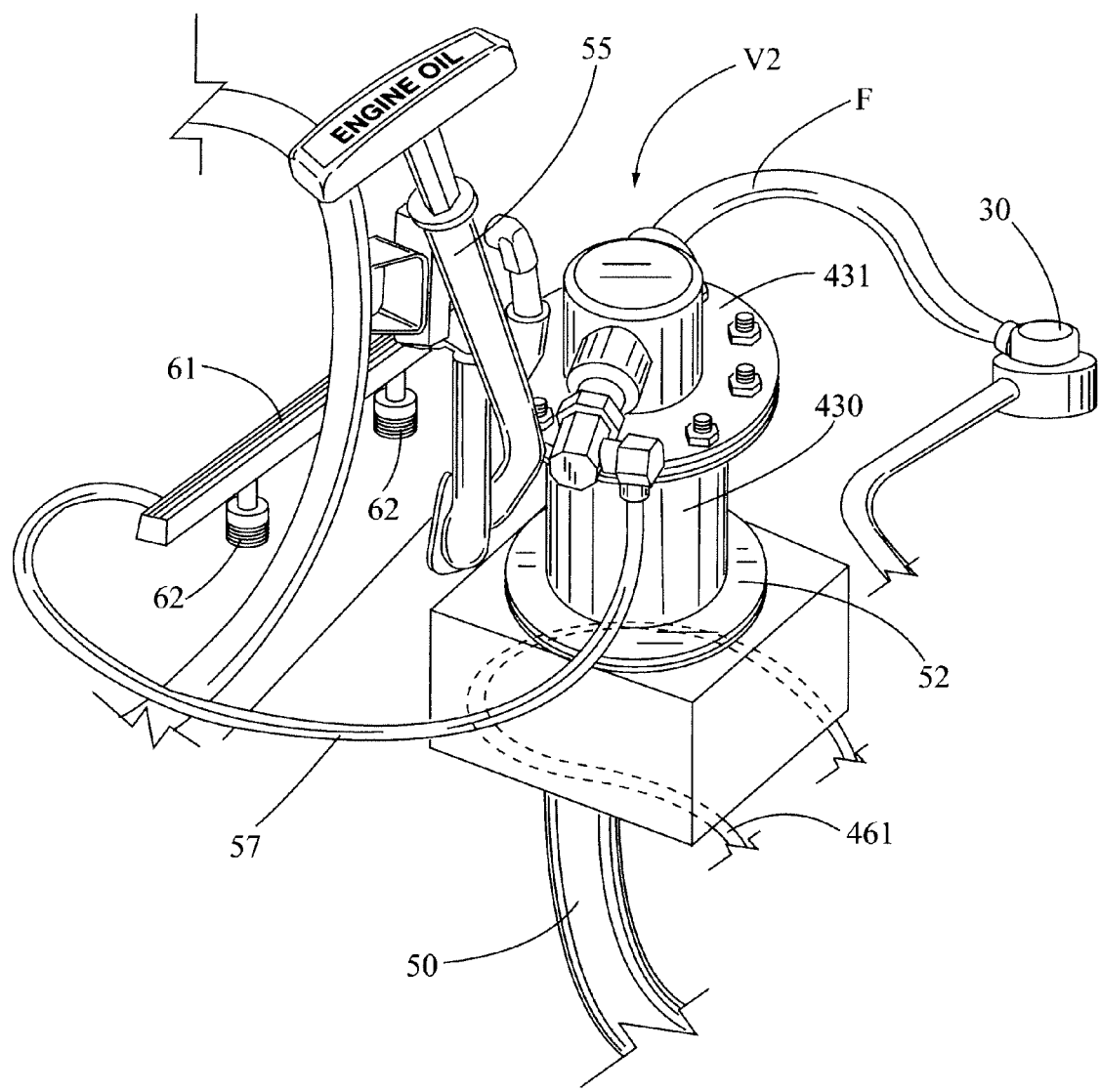
FIG. 3 is a top perspective view of a vaporizer installed on an engine.
Figure 4:
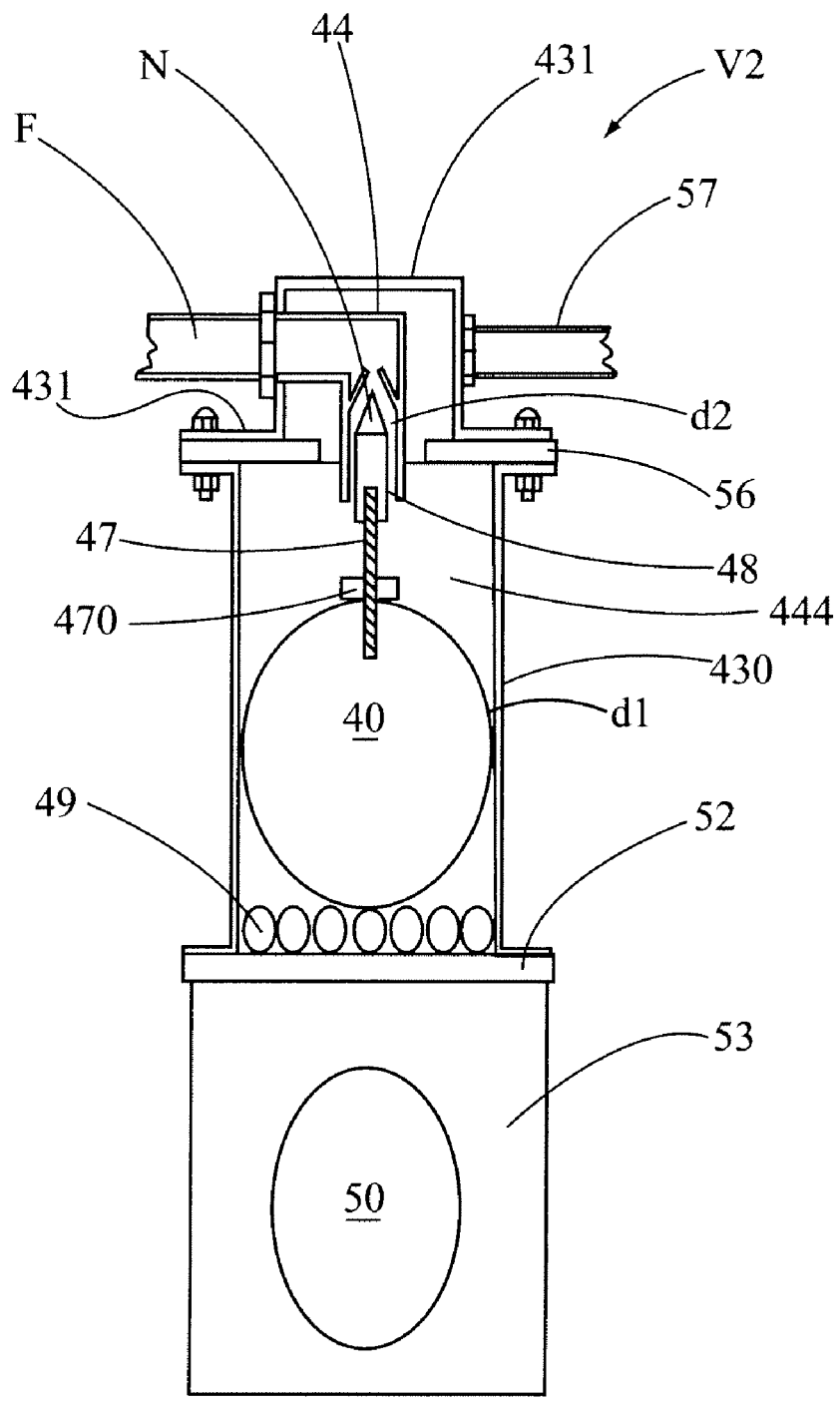
FIG. 4 is a cross sectional view of the gasoline vaporizer shown in FIG. 3.

Referring next to FIGS. 3, 4 the vaporizer V2 is seen in more detail. The housing 430 has top 431 bolted to the housing 430 with a gasket 56 therebetween. The bottom of housing 430 has a heat sink 52 and a heat exchanger 53, which could be ceramic (such as Zirconium) or metal. Heat exchanger 53 may be physically connected to the exhaust manifold 50, and/or receive heat from heat exchanger lines 461 which are preferably steel lines filled with silicon oil and pumped thermostatically by a control pump 46 to maintain a constant temperature.

Inside the housing 430 the float 40 may travel up and down the inside of housing 430 with nominally about a $1/16$ inch clearance, d1. A (brass) guide/pin 48 supports needle N. A nominal clearance of about $40/1000$ inch may exist between guide 48 and the side wall of the seat 44, d2. A (threaded) rod 47 is rigid and connects the float 40 to the needle N via guide/pin 48. Nut 470 provides adjustment for the needle N in the float 40.

The preferred material for the ceramic heat exchanger 53 is a zircon based cement such as Sauereisen™ Zircon Potting Cement No. 13, Pittsburgh, Pa.

| Product Identification | |
| --- | --- |
| Product Name | 13 Zircon Potting Cement |
| Item Number | 13-Q |
| Item Description | Zircon Potting Cement (PWD) |

-continued

| Product Identification | |
| --- | --- |
| Product Description | Zircon Potting Cement (Powder) |
| Chemical Family | Magnesium Phosphate Cement |
| Revision Date | Nov. 30, 2005 |

| Composition and Data on Components | | | |
| --- | --- | --- | --- |
| Component/CAS # | ACGIH TLV | OSHA PEL | % WT |
| Zirconium Silicate 14940-68-2 | 10 MG/M3 (TWA) | 15 MG/M3 (STEL) | <75% |
| Silica, Crystalline 14808-60-7 | 0.025 MG/M$^3$ TWA | 0.1 MG/M$^3$ STEL | <1% |
| Magnesium Oxide 1309-48-4 | 10 MG/M$^3$ (DUST) | 10 MG/M$^3$ (DUST) | <15% |

Figure 5:
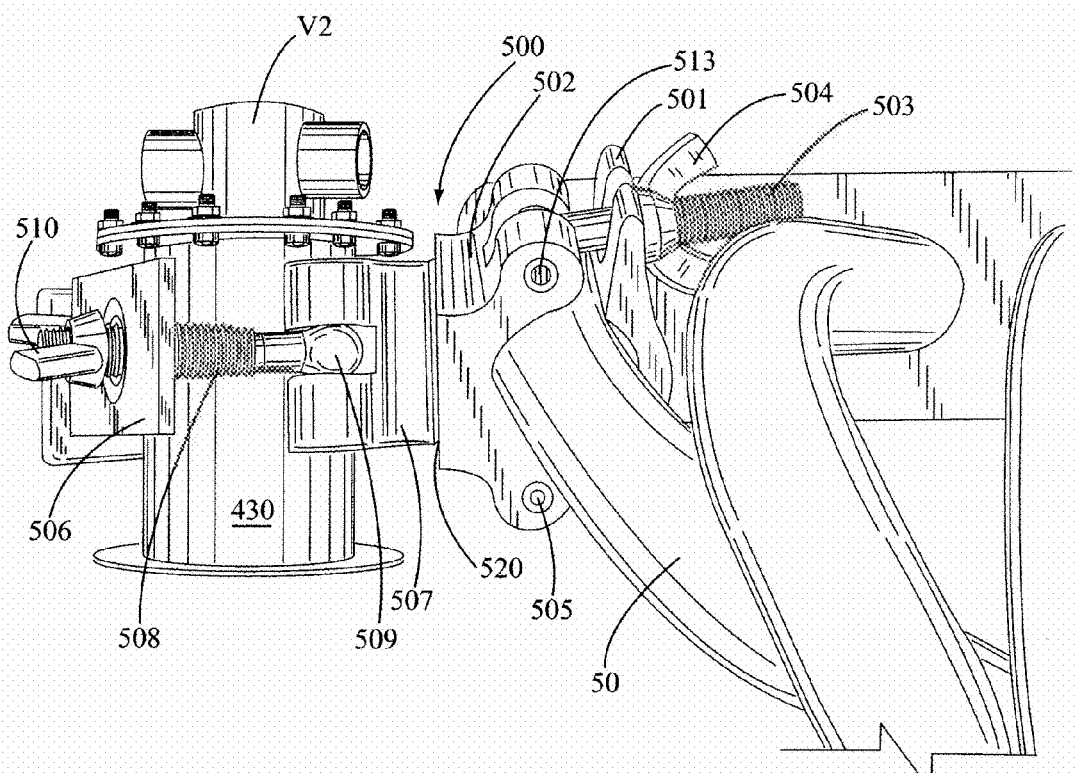
FIG. 5 is a side perspective view of an alternate clamp fixture for the vaporizer.

Referring next to FIG. 5 the vaporizer V2 is held in thermal contact with the exhaust manifold 50 by means of a dual clamp 500. A clamp base 507 rests against housing 430 and is secured to the housing 430 by means of a clamp top, bolt 508 and wing nut 510. The base 509 of bolt 508 is pivotally mounted in clamp base 507. An exhaust base 502 connects to the vaporizer base 507 at junction 520 at a desired angle to keep the vaporizer V2 upright as shown. A hole can be drilled between the two bases and a pin inserted (not shown) to secure the bases. The exhaust base 502 is secured against the exhaust manifold 50 by means of a clamp top 501, bolt 503 and wing nut 504. The bolt 503 has pivot mount 513 to the exhaust base 502. This clamp embodiment provides a universal type mount for the vaporizer V2 to fit on many sizes of exhaust manifolds 50.

Figure 6:
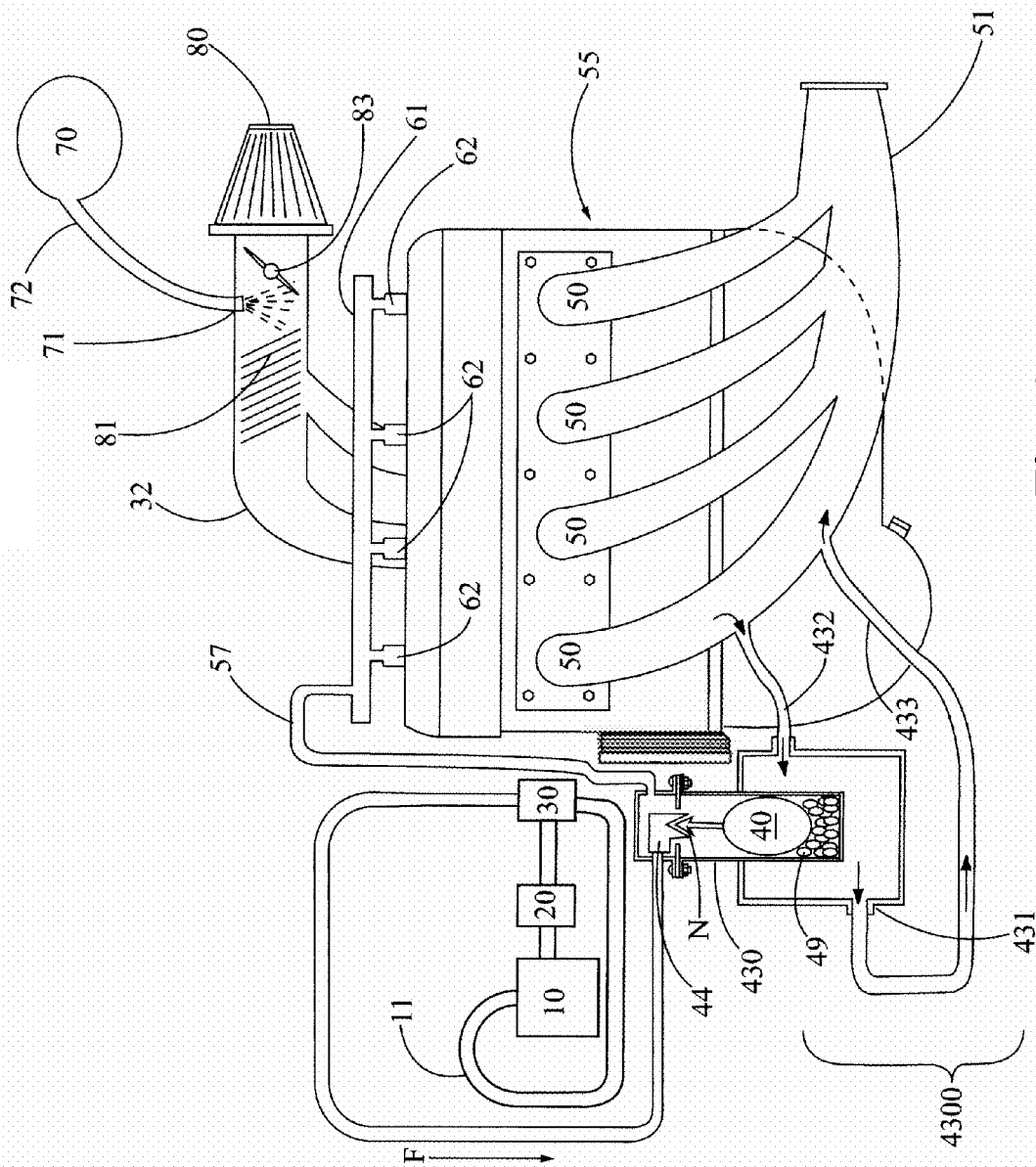
FIG. 6 is a schematic drawing of an exhaust gas heated vaporizer.

Referring next to FIG. 6 a vaporizer assembly 4300 consists of the housing 430 and its internal parts described in FIG. 2, plus a side and lower heating chamber 431. The heating chamber 431 receives exhaust gas from manifold 50 via pipe 432. The hot exhaust gas surrounds the base and sides of housing 430 and vaporizes the fuel. The exhaust gas is then returned to the manifold via pipe 433.

Figure 7:
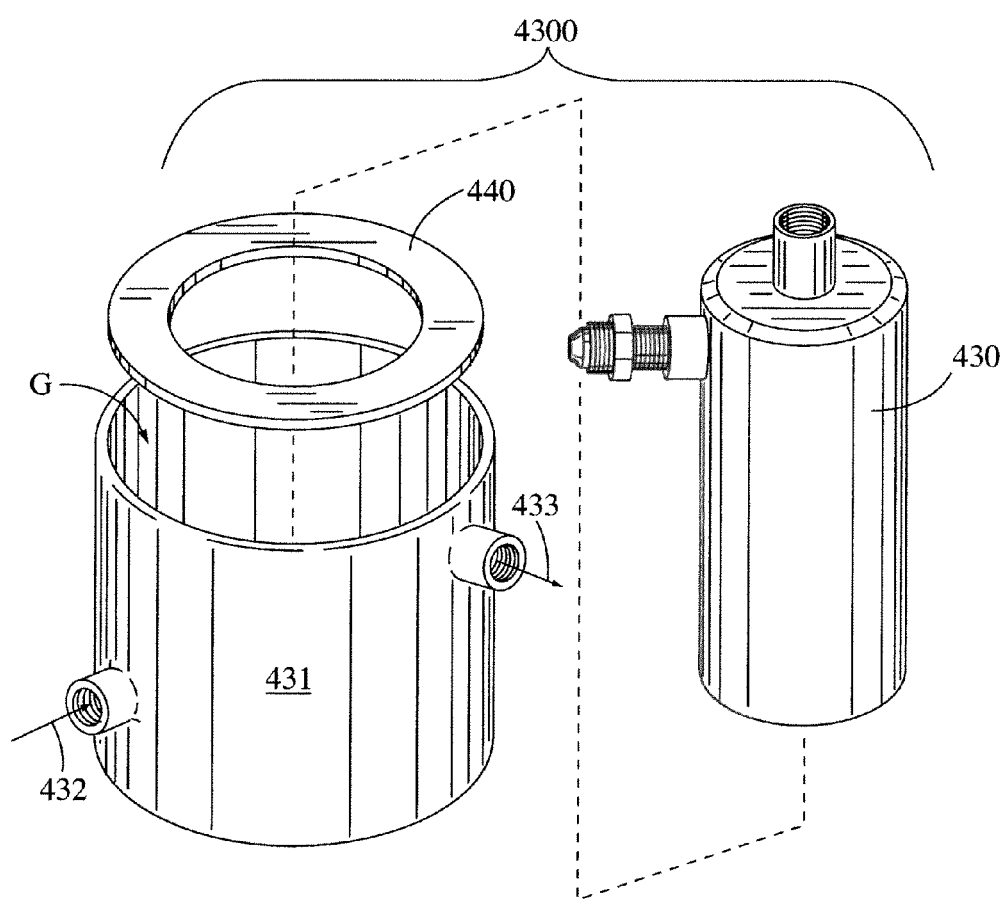
FIG. 7 is an exploded view of the exhaust gas heated vaporizer of FIG. 6.

Referring next to FIG. 7 the vaporizer assembly 4300 consists of the housing 430 installed inside heating chamber 431 which leaves a gap G around the housing 430. A washer 440 seals the top of the heating chamber 431.

Figure 8:
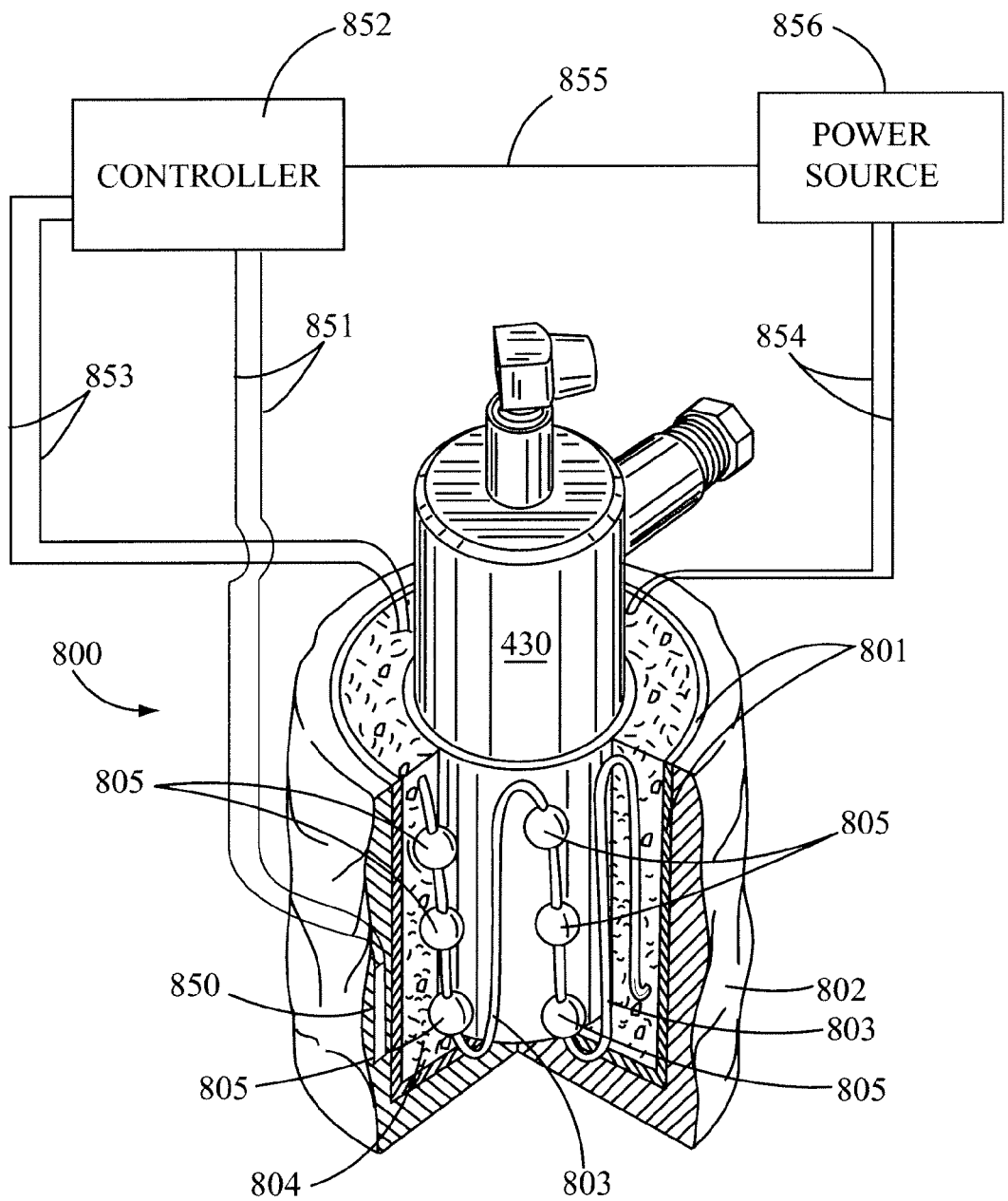
FIG. 8 is a cutaway view of an electric heated embodiment.

Referring next to FIG. 8 a heating chamber 800 consists of a housing 801 protected by an insulator 802. The housing 430 fits inside the housing 801, and the gap G of FIG. 7 is filled with an electric resistor 803, which is packed in a cement 804. Glass beads 805 are placed on the electrical resistor to provide adequate spacing in the gap G. The electric resistor 803 is preferably a nichrome wire cut to the length needed to reach vaporization temperature. A thermostat is added for additional stabilization of temperature. An optional thermostat 850 is shown with lead wires 851 going to a controller 852. The controller 852 manages via the wire 855 power output from the power source 856 to the resister leads 853, 854.

Figures 9, 10:
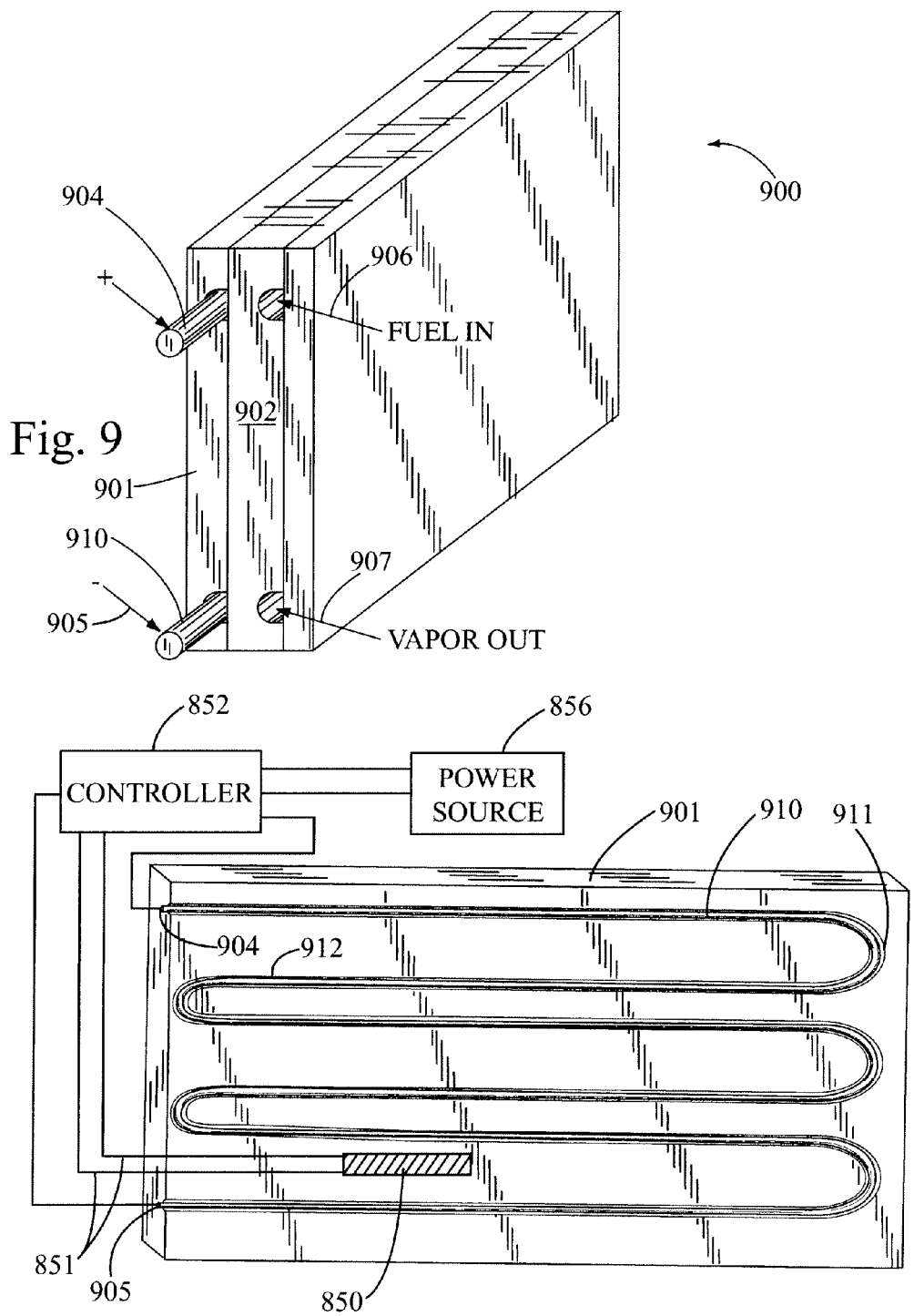
FIG. 9 is a top perspective view of an electric block embodiment.
FIG. 10 is a side elevation view of the electric heater module of the FIG. 9 embodiment.

Referring next to FIG. 9 a heater block vaporizer 900 consists of three modules which are slabs that form aluminum block 900. Module 901 is an electric heater slab with a positive connection 904 for a resistor 910 and a negative connection 905 for the resistor (preferably Nichrome wire).

In FIG. 10 the channel 912 is chosen at a length for the resistor 910 to maintain vaporization temperature of the fuel. A cement 911 surrounds the resistor 910.

An optional thermostat 850 can control the power to the leads 904, 905 via the controller 852.

Figure 11:
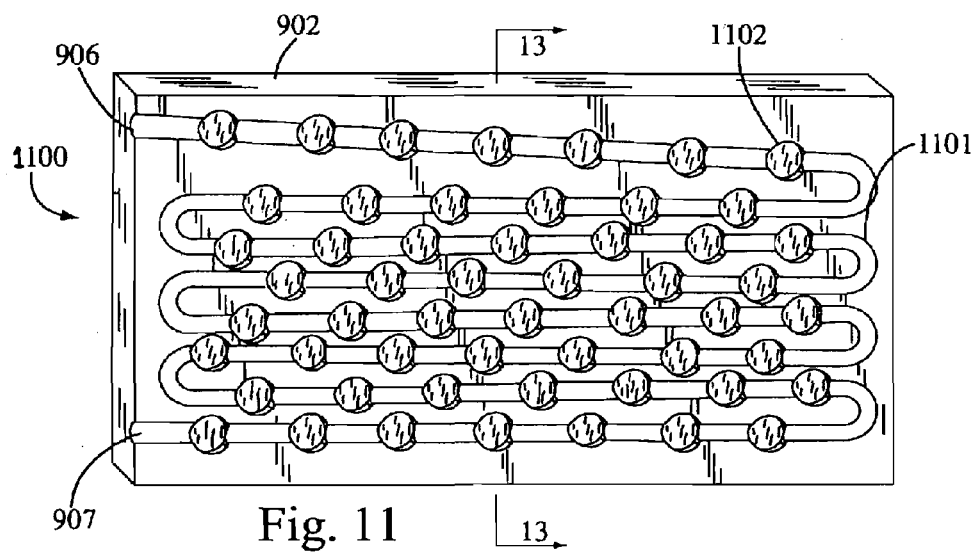
FIG. 11 is a side elevation view of the central fuel module of the FIG. 9 embodiment.

In FIG. 11 the back 1100 of module 902 seals off the channel 912. A serpentine fuel channel 1101 is chosen at a length of about 30 to 40 inches (36 inches by 5/16 inch deep) such that liquid fuel entering entry port 906 vaporizes before it leaves exit port 907. The channel 1101 is intersected by 3/8 inch scalloping holes 1102 to allow the fluids to swirl and absorb more heat.

Figure 12:
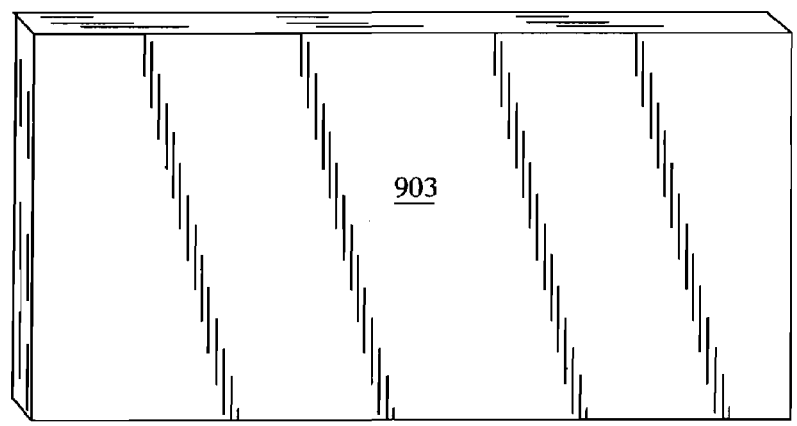
FIG. 12 is a side elevation view of the end module of the FIG. 9 embodiment.

In FIG. 12 shows a side elevation view of a block of (preferably) aluminum 903 used to complete the vaporizer 900. This construction allows a milling operation to create the fuel channel 1101 before final assembly.

Figure 13:
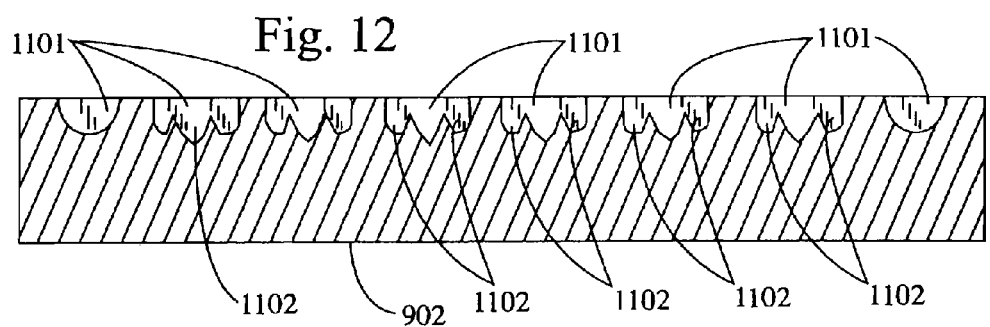
FIG. 13 is a cross sectional view of the central fuel module taken along line 13-13 of FIG. 11.

In FIG. 13 shows the machined scalloping holes 1102 in the fuel channel 1101. These scalloping holes 1102 force the fuel over increased surface area of the heated channel 1101, thereby absorbing more heat in less distance of travel in channel 1101.

Figure 14:
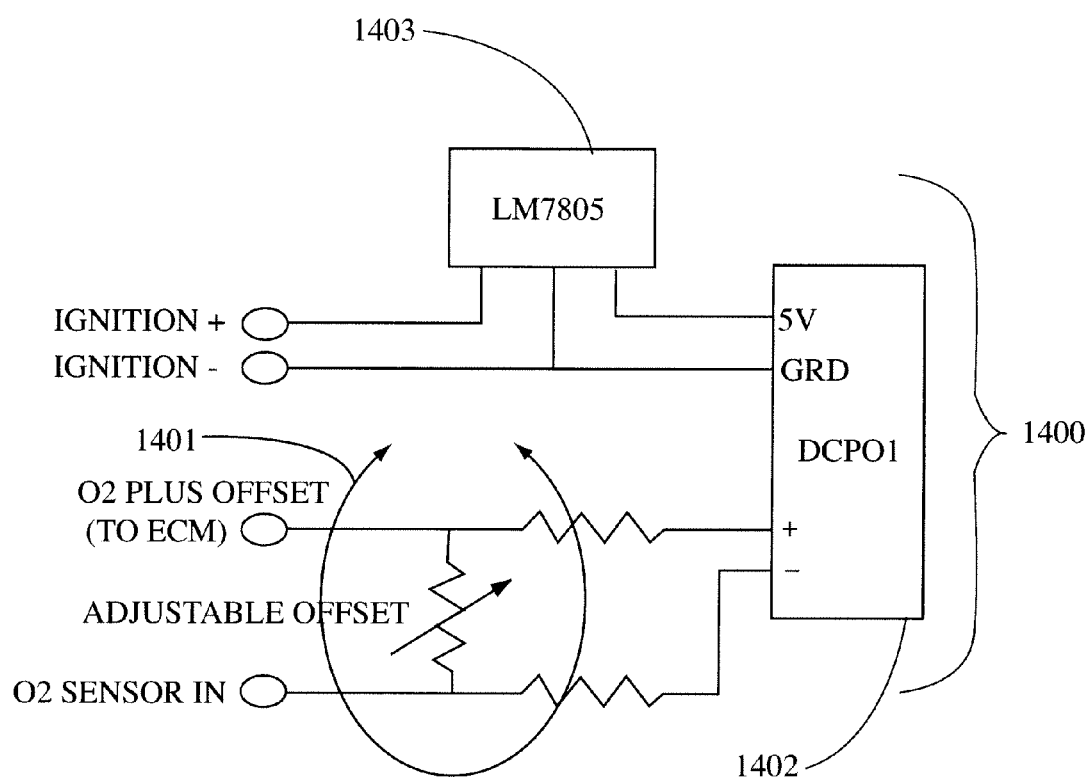
FIG. 14 is a circuit layout of the O2 sensor to offset the O2 signal.

In FIG. 14 an engine control circuit (ECU) 1400 has been altered with a variable DC offset voltage circuit 1401 to correct outputs from the O2 sensor for use of the present vaporizer inventions.

The LM7805 (1403) is a volt converter, and the DCP01 (1402) is a isolated power supply.

A program change is needed for the fuel saving device to operate correctly with fuel injected vehicles/engines with emission control equipment. Most modern vehicles 1996 and newer are equipped with OB2 computers, Oxygen sensors, MAF sensors, throttle body positioning sensors, and other sensors that make up the emission control package. The OB2 computer or ECU uses information or the signal from the O2 sensor(s) to determine if the air/fuel mixture is too rich or too lean. Most vehicles are designed to operate at a Stoichiometric Ratio of 14.7 to 1. This standard is set by the OEM industry. This air/fuel ratio which indicates 14.7 parts of air to one part of fuel. This air/fuel ratio is also known as Lambda. Modern engines are set to run at Stoichiometric or Lambda. Lambda is also known as 1. Lambda is a convenient number to work with since its value represents the correct Stoichiometric mixture. If the engine exhaust shows less than Lambda this indicates a richer mixture. If the engine exhaust shows above Lambda this indicates a leaner mixture. The OB2 computer uses the signal from the O2 sensors to determine if more or less fuel should be added to the mix in order to maintain Lambda at 1. This scenario is okay when no fuel efficiency device is added to the vehicle's engine. The problem that is encountered when the fuel efficiency device of the present invention is added to the engine is an increase in oxygen in the vehicle's exhaust. The fuel saving device burns the fuel more efficiently which causes the oxygen content in the exhaust to rise. The oxygen rises in the exhaust for a number of reasons: a) Less fuel is being used to produce an equivalent amount of horsepower, and b) less oxygen is being consumed to create carbon monoxide and oxides of nitrogen. This increased oxygen level is detected in the exhaust by the O2 sensor(s) and a signal is sent to the vehicles' computer. This increased oxygen signal is sensed by the OB2 computer and thinks that the air/fuel mixture is above Lambda or too lean a mixture. The computer uses this artificial relationship to upset the fuel efficiency device by dumping in more fuel in the mix in an attempt to bring the engine back to a Stoichiometric Ratio of 14.7 to 1 air/fuel ratio. This action actually negates the fuel savings of the fuel efficiency device and in some cases will cause a higher increase in fuel consumption. This solution for this series of events is quite simple. The signal coming from the O2 sensor(s) needs to be adjusted before it gets back to the computer signaling the correct amount of oxygen in the exhaust than there actually is. Fooling the computer to think this way and allow the fuel efficiency device to function properly can be done in several ways. Option 1) a V.A.L.V.O.C. circuit can be wired between the O2 sensor(s) and the OB2 computer. V.A.L.V.O.C. stands for Varying Adjustable Low Voltage Offsetting Circuit. This circuit adjusts the low voltage signal from the O2 sensor(s) and offsets the signal going to OB2 computer. This offset circuit actually gives a slight increase in voltage to the existing signal thus giving a richer mixture reading to the OB2 computer. This in turn allows the computer to make adjustments shutting down fuel to the injectors. This same affect can be brought to bear on the OB2 computer using Option (2) and Option (3). Option (2) A chip can be programmed for the OB2 computer to offset/adjust the O2 sensor(s) signal to indicate a richer mixture and close down the fuel injectors just as the V.A.L.V.O.C. circuit. Option (3) the OB2 computer can be flashed with a computer interface with similar files as the chip mentioned in Option (2).

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A fuel vaporizer comprising:
a first module having a body with an inlet for receiving a liquid fuel and a channel cut in an end wall of the body which connects to a vapor fuel outlet;
said body being formed from a metallic material;
a second module having a heater and associated with the first module so as to provide a heat exchange to the first module to keep the second module at a set point temperature;
said body having a solid surface which abuts a channel in said second module containing said heater; and
a third module for closing said channel in the body,
wherein the channel has length sufficient to vaporize all the liquid fuel when the first module is at the set point temperature.

2. The apparatus of claim 1, wherein the first module is a metal plate, wherein the channel in the body has a serpentine or zigzag pattern in the plate, and wherein the channel in the body has fluting or scalloping to increase its vaporization surface.

3. The apparatus of claim 2, wherein the second module is a second metal plate adjoining the first module, said heater comprises an electric heating element which is mounted in said channel in said second module, and said channel in said second module has a serpentine or zig zag pattern.

4. The apparatus of claim 3, wherein the electric heating element is embedded in a potting cement in the channel in said second module and is powered by a battery.

5. The apparatus of claim 1, wherein the set point temperature is in the range of about 325 to 425° F.

6. The apparatus of claim 5, wherein the channel has a width of about 5/16 inch, and a length of about 30 to 40 inches.

7. The apparatus of claim 1, wherein at least one of the modules comprises a slab formed from an aluminum block.

8. The apparatus of claim 1, wherein said modules comprises slabs that form an aluminum block.

9. The apparatus of claim 1, wherein said second module has a positive connection for a resistor and a negative connection for a resistor.

10. The apparatus of claim 9, further comprising a controller and a thermostat for controlling power to the positive and negative connections via said controller.

11. The apparatus of claim 1, wherein the channel in said second module has a length to maintain vaporization temperature of the liquid fuel.

12. The apparatus of claim 1, wherein a back of said first module seals off the channel in said second module.

* * * * *